(12) United States Patent
Gunkel et al.

(10) Patent No.: US 6,746,641 B1
(45) Date of Patent: Jun. 8, 2004

(54) METHOD FOR PRODUCING CELLULOSIC FORMS

(75) Inventors: Holger Gunkel, Rudolstadt (DE); Michael Mooz, Volkmannsdorf (DE)

(73) Assignee: Zimmer AG, Frankfurt (DE)

(*) Notice: Subject to any disclaimer, the term of this patent is extended or adjusted under 35 U.S.C. 154(b) by 0 days.

(21) Appl. No.: 09/787,310

(22) PCT Filed: Sep. 14, 1999

(86) PCT No.: PCT/DE99/02976

§ 371 (c)(1), (2), (4) Date: Aug. 28, 2001

(87) PCT Pub. No.: WO00/17424

PCT Pub. Date: Mar. 30, 2000

(30) Foreign Application Priority Data

Sep. 17, 1998 (DE) .......................... 198 42 556

(51) Int. Cl.[7] .............................. A61L 2/10; B01J 19/12; D01F 2/02; D01F 13/00

(52) U.S. Cl. ................... 264/464; 250/492.1; 264/37.2; 264/187; 264/209.1; 264/233; 422/24; 422/186.3; 425/71; 425/174.4

(58) Field of Search ........................... 264/209.1, 233, 264/37.2, 187, 464; 425/71, 174.4; 422/24, 186.3; 250/492.1

(56) References Cited

U.S. PATENT DOCUMENTS

| 5,650,112 A | 7/1997 | Zikeli et al. ................. 264/187 |
| 5,891,370 A | * 4/1999 | Connor et al. ............. 264/37.2 |
| 5,984,655 A | 11/1999 | Schwenninger et al. ...... 425/71 |

* cited by examiner

*Primary Examiner*—Leo B. Tentoni
(74) *Attorney, Agent, or Firm*—Marianne Fuierer; Steven Hultquist; Yongzhi Yang

(57) ABSTRACT

Process for producing formed cellulosic articles, such as fibers, filaments, sheetings, membranes or tubes, comprising a) extruding a solution of cellulose in an aqueous amine oxide, particularly N-methylmorpholine N-oxide, through an extrusion die via an air gap and coagulating the formed article in an aqueous precipitation bath containing amine oxide, and b) passing the formed article through at least one washing stage for removing residual amine oxide from the article, characterized in that the liquor of the precipitation bath in the precipitation stage and/or the washing liquor of the washing stage(s) is treated with ultra-violet radiation. In this manner the formation and growth of coatings, films and slime deposits caused by microorganisms is avoided on parts of the plant which come into contact with said liquors containing the amine oxide.

15 Claims, 1 Drawing Sheet

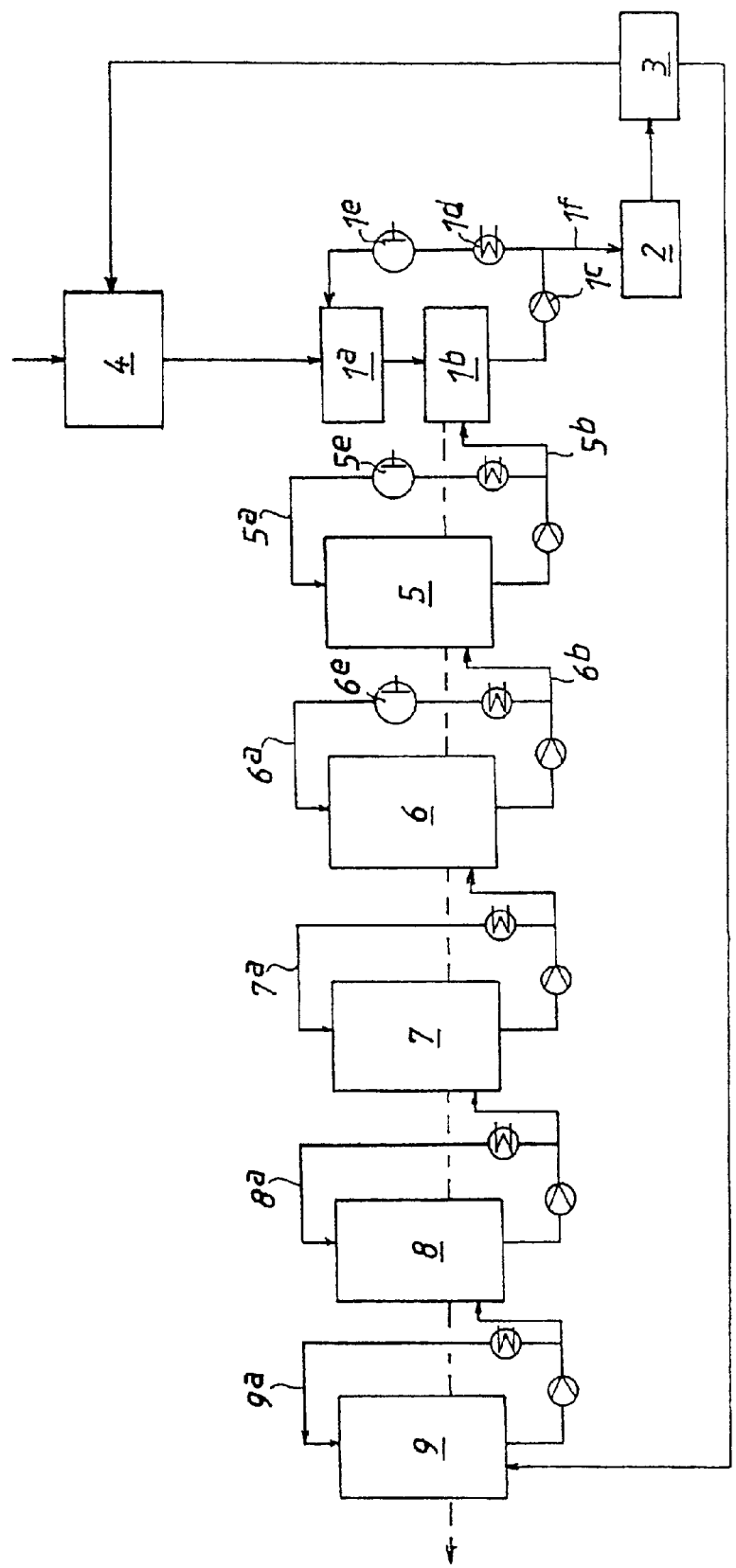

METHOD FOR PRODUCING CELLULOSIC FORMS

CROSS-REFERENCE TO RELATED APPLICATIONS

This application is filed under the provisions of 35 USC §371 and claims the priority of International Patent Application No. PCT/DE99/02976 filed Sep. 14, 1999, which in turn claims priority of German Patent Application No. 198 42 556.2 filed Sep. 17, 1998.

FIELD OF THE INVENTION

The invention relates to a process for producing formed cellulosic articles, such as fibres, filaments, sheetings, membranes or tubes, comprising a) extruding a solution of cellulose in an aqueous amine oxide, particularly N-methylmorpholine N-oxide, through an extrusion die via an air gap and coagulating the formed article in an aqueous precipitation bath containing amine oxide, and b) passing the formed article through at least one washing stage for removing residual amine oxide.

BACKGROUND OF THE INVENTION

While the precipitation bath usually has concentrations of N-methylmorpholine N-oxide (NMMO) from 10 to 25% by mass and temperatures from 0 to 20° C., in the subsequent washing stages the NMMO content of the washing liquors is decreased to nearly 0% at temperatures up to 80° C. It is known that these NMMO-containing liquors are characterized by a partially very strong growth of microorganisms. These biological substances are sustantially bacteria and fungi and cause considerable difficulties with the processing by the formation of slime aggregates and biofilms. The function of parts of the production plant can be impaired by clogging of pipes, filters, pumps etc. up to their total breakdown. A mechanical cleaning of the washing and precipitation bath systems is very expensive due to the marked adhesion of the polymeric slime substances to all the surfaces and results in unwanted interruptions of the production process.

From WO 96/18761 a process is known in which the biological substances in the baths are degraded by using usual oxidants, such as e.g. hydrogen peroxide, peracetic acid, ozone or chlorine dioxide. With this method it must be assured by an expensive mechanism that these oxidants are completely disposed before recycling the NMMO into the dope production stage.

According to the process specified in WO 97/07137 a microbicidal agent is added during or after the regeneration of solutions containing amine oxide in order to avoid formation of films in the apparatus. In this case likewise the disadvantage exists that the added substance or its degradation products are concentrated in the NMMO cycle of the process and cause unwanted effects in the individual process steps. The consequences for the thermal stability of the NMMO and the accompanied safety risk must be particularly critically considered.

From WO 97/07108 and WO 97/07138 the UV treatment of amine oxide containing solutions is known with the aim to destroy the N-nitrosomorpholine formed during or after the oxidation of N-methylmorpholine (NMM) to NMMO. The UV treatment is restricted to the regeneration of the precipitation bath for the purpose of reusing the regenerated NMMO for preparing the dope.

SUMMARY OF THE INVENTION

It is the object of the invention to avoid the formation and growth of the coatings, films and slime aggregates formed by microorganisms in the parts of the plant having contact with the MMO containing liquors and the impairment and operating troubles caused thereby. Particularly the above-mentioned process should not require frequent cleaning of the plant even in a continuous operation. Furthermore, it should be refrained from using chemical substances in order to avoid the problems of their monitoring and, if required, their re-separation accompanied therewith. Further advantages can be gathered from the following specification.

With the process specified at the beginning, according to the invention these objects are achieved in that the liquor of the precipitation bath in the precipitation stage and/or the washing liquor of the washing stage(s) is treated by ultra-violet radiation. Surprisingly it has been found that the microorganisms developing in liquors containing amine oxide, particularly NMMO, which microorganisms result in the unwanted deposits, are deactivated by the UV radiation or their DNS (deoxyribonucleic acid) is killed by a UV induced reaction. As a result the total germ number in the liquor is maintained low, and possible cleanings of the plant are only necessary after substantially longer operating periods.

According to the preferred embodiment of the process of the invention a ultra-violet radiation of a wave length in the range from 200 to 280 nm is used. Especially the used UV radiation has a wave length of 254 nm: Conveniently this radiation is generated by a mercury low-pressure lamp the maximum intensity of which is at this wave length.

Preferably the UV treatment of the liquors of the washing stage(s) is limited to a temperature below 50° C. When operating with several washing steps in series the temperature of the washing liquor of the last steps is often elevated above 50° C. in order to support washing the amine oxide out of the formed articles. In these stages the UV radiation treatment can be omitted because the microorganisms cannot develop at these temperatures. On the other hand the growth of the microorganisms is strongly inhibited at temperatures below 20° C. As the precipitation baths are frequently maintained below this temperature the radiation can then be markedly reduced. As far as it is possible in the subsequent washing stages to avoid temperatures between 20 and 40° C., the radiation power can be reduced also in those stages.

Preferably the precipitation bath liquors or the washing liquors having a Hazen Color Number $Hz \leq 400$ are subjected to the UV treatment. It has been found that more intense colorings of the liquors reduce the efficiency of the UV treatment and require higher radiation powers. The effectivity of the UV treatment is ensured up to said Hazen Color Number. Consequently, suppressing the formation of colored side products is also advantageous with the UV treatment of the precipitation bath and washing liquors according to the invention aside from other reasons.

If with the process of the invention the precipitation bath and several washing stages are connected in series and comprise liquor cycles of their own, the cycle liquors of the precipitation bath and the first washing stage(s) are treated with UV radiation because these liquors offer comparatively favorable conditions (temperature, content of organic substances) for the development of microorganisms. As the liquor from the last washing stage is passed to the precipitation bath opposite to the movement of the fibres, it is repeatedly exposed to the UV radiation on this path. The UV radiation in a cycle can be carried out continuously or intermittently. It is possible to integrate the UV radiators in a simple manner also in already existing plants.

Preferably the cycle liquors are irradiated with a power in the range from 0.1 to 1.0 Wh/l, especially with 0.5 Wh/l. The conditions for the microbiological growth and the effectiveness of its combat by UV radiation are very different depending on the pH value, temperature, concentration of NMMO, oxygen introduction and light transmission (color number). The respective specific conditions can be taken into account by adapting the power and duration of the UV irradiation.

BRIEF DESCRIPTION OF THE DRAWINGS

The FIGURE shows a diagrammatic representation of a plant for carrying out the process of the invention with a precipitation bath and a connected five-stage washing part.

The precipitation bath has an internal cycle for the bath liquor from the catch vat $1^b$ to the spinning vessel $1^a$ with a pump $1^c$, a cooler $1^d$ and a UV radiator $1^e$. Spent precipitation bath is withdrawn via line $1^f$ and passed to a cleaning stage 2. The cleaned precipitation bath is concentrated in the stage 3. The formed NMMO concentrate is used in the stage 4 for preparing the dope which is pumped to the spinnerets. The distillate formed in the stage 3 is fed as washing liquor to the last washing stage 9.

The first washing stage 5 has an external washing liquor cycle $5^a$ with an UV radiator $5^e$. NMMO-containing washing liquor is passed from the cycle $5^a$ via a line $5^b$ to the catch vat $1^b$ The second$^d$ washing stage 6 is provided with an UV radiator $6^e$ in the same manner as the first washing stage 5. The further washing stages 7,8 and 9 have likewise external washing agent cycles $7^a$ $8^a$ and $9^a$, respectively, which differ from the cycles $5^a$ and $6^a$ in that no UV radiator is arranged in them because the temperatures of the washing agent is here maintained above 50° C. The path of the extruded products through the plant is shown by a dashed line.

DETAILED DESCRIPTION OF THE INVENTION

PRACTICAL EXAMPLE

In the plant shown in the FIGURE the UV radiators are operated with a power of 0.5 Wh/l circulated liquor. The total germ number was determined in intervals of 2 days with samples from the precipitation bath by means of cultures (TTC Agar). The total germ number was continuously below $10^5$/ml. A cleaning was only necessary after 2 months.

COMPARATIVE EXAMPLE

With the same procedure as in the practical example, however without the UV irradiation, an increase of the total germ number to >$10^6$/ml already found after 5 days inspite of a careful cleaning and disinfection.

What is claimed is:

1. A process to avoid formation and growth of coatings, films and slime aggregates formed by microorganism in the production of formed cellulosic articles, such as fibres, filaments, sheetings, membranes or tubes, comprising a) extruding a solution of cellulose in an aqueous amine oxide, particularly N-methylmorpholine N-oxide, through an extrusion die via an air gap and coagulating the formed article in an aqueous precipitation bath containing amine oxide, and b) passing the formed article through at least one washing stage for removing residual amine oxide, characterized in that the liquor of the precipitation bath in the precipitation stage and/or the washing liquor in the washing stage(s) is treated with ultra-violet radiation.

2. The process according to claim 1 wherein the ultra-violet radiation has a wave length in the range from 200 to 280 nm.

3. The process according to claim 2 wherein the ultra-violet radiation has a wave length of 254 nm.

4. The process according to claim 2 wherein the ultra-violet radiation is generated by a mercury low-pressure lamp.

5. The process according to claim 2 wherein the UV treatment is limited to the liquors of the washing stage(s) having a temperature below 50° C.

6. The process according to claim 1 wherein precipitation bath liquors or washing liquors having a Hazen color number Hz≦400 is subjected to the UV treatment.

7. The process according to claim 1 wherein the precipitation bath and several washing stages are connected in series and have liquor cycles of their own, characterized in that cycle liquors of the precipitation bath and the first washing stage(s) are treated with ultra-violet radiation.

8. The process according to claim 1 characterized in that power of the UV-radiation is in the range from 0.1 to 1.0 Wh/l.

9. A system for reducing unwanted microorganisms in liquors containing amine oxide, comprising:

a precipitation bath; and a series of washing stages communicatively connected to each other and the precipitation bath wherein the precipitation bath and at least one of the washing stages comprise a UV radiation source positioned for irradiating the washing liquor therein with ultra-violet radiation to reduce unwanted microorganisms in the washing liquor.

10. The system according to claim 9 wherein the ultra-violet radiation has a wave length in the range from 200 to 280 nm.

11. The system according to claim 9 wherein the ultra-violet radiation has a wave length of 254 nm.

12. The system according to claim 9 wherein the ultra-violet radiation is generated by a mercury low-pressure lamp.

13. The system according to claim 9 wherein the irradiation treatment is limited to the liquors of the washing stage(s) having a temperature below 50° C.

14. The system according to claim 9 wherein liquors in the precipitation and/or washing stages having a Hazen color number Hz≦400 is subjected to the UV treatment.

15. A method for reducing unwanted microorganisms in washing liquors containing amine oxide, comprising:

irradiating washing liquor containing a N-methylmorpholine N-oxide in at least one washing stage with ultra-violet radiation in a sufficient amount to effectively reduce unwanted microorganisms therein, the ultra-violet radiation having a wave length in the range from 200 to 280 nm.

* * * * *

UNITED STATES PATENT AND TRADEMARK OFFICE
CERTIFICATE OF CORRECTION

PATENT NO. : 6,746,641 B1
DATED : June 8, 2004
INVENTOR(S) : Gunkel et al.

It is certified that error appears in the above-identified patent and that said Letters Patent is hereby corrected as shown below:

Column 2,
Line 2, "MMO" should be -- NMMO --

Column 3,
Line 28, "$1^b$" should be -- $1^b$. --
Line 28, "second$^d$" should be -- second --
Line 31, "$7^b\ 8^a$" should be -- $7^b, 8^a$ --

Signed and Sealed this

Ninth Day of November, 2004

JON W. DUDAS
*Director of the United States Patent and Trademark Office*